(12) United States Patent
Müller

(10) Patent No.: US 6,687,460 B2
(45) Date of Patent: Feb. 3, 2004

(54) FOCUSING HOOD FOR USE ON A DIGITAL CAMERA

(76) Inventor: Jochen Müller, Grawolfstrasse 31a, Gräfelfing (DE), 82166

(*) Notice: Subject to any disclaimer, the term of this patent is extended or adjusted under 35 U.S.C. 154(b) by 0 days.

(21) Appl. No.: 09/959,325

(22) PCT Filed: Feb. 23, 2001

(86) PCT No.: PCT/EP01/02102
§ 371 (c)(1),
(2), (4) Date: Dec. 4, 2001

(87) PCT Pub. No.: WO01/63913
PCT Pub. Date: Aug. 30, 2001

(65) Prior Publication Data
US 2002/0159775 A1 Oct. 31, 2002

(30) Foreign Application Priority Data
Feb. 23, 2000 (DE) .......................... 100 09 545

(51) Int. Cl.[7] .................. G03B 11/04; G03B 11/00; G03B 13/02; H04N 5/222
(52) U.S. Cl. ..................... 396/534; 396/544; 396/374; 348/333.01
(58) Field of Search .................. 396/374, 534, 396/544, 287; 348/373, 376, 333.01

(56) References Cited

U.S. PATENT DOCUMENTS

| | | | |
|---|---|---|---|
| 2,054,442 A | | 9/1936 | Percy |
| 3,882,517 A | * | 5/1975 | Land et al. ................. 359/892 |
| 3,914,779 A | * | 10/1975 | Terunuma .................... 396/198 |
| 4,381,892 A | * | 5/1983 | Someya ....................... 396/534 |
| 5,517,278 A | * | 5/1996 | Takahara et al. ........... 396/374 |
| 6,141,504 A | * | 10/2000 | Hasushita ................... 396/380 |
| 6,217,235 B1 | * | 4/2001 | Kondo ........................ 396/421 |
| 6,453,125 B2 | * | 9/2002 | Shono ........................ 396/287 |

OTHER PUBLICATIONS

Patent Abstracts of Japan, vol. 1999, No. 10, Aug. 31, 1999 & JP 11 136546 A (Kyocera Corp), May 21, 1999, Abstract.*
Patent Abstracts of Japan, vol. 1998, No. 12, Oct. 31, 1998 & JP 10 200794 A (Matsushita Electric Ind Co Ltd), Jul. 31, 1998, Abstract.
Patent Abstracts of Japan, vol. 1999, No. 10, Aug. 31, 1999 & JP 11 136546 A (Kyocera Corp), May 21, 1999, Abstract.
Patent Abstracts of Japan, vol. 1998, No. 08, Jun. 30, 1998, & JP 10 062840 A (Minolta Co. Ltd), Mar. 6, 1998, Abstract.

* cited by examiner

Primary Examiner—Russell Adams
Assistant Examiner—Andrew Sever
(74) Attorney, Agent, or Firm—Nixon Peabody LLP; David S. Safran (57) ABSTRACT

A telescopically extendible focusing hood which improves the viewing of the LCD screen of a digital camera in bright surrounding light. The focusing hood can be fixed to the rear wall of the camera, surrounding the LCD screen. The focusing hood preferably has an anti-reflection-coated enlarging lens or glass disk which covers the entire cross-section of the focusing hood in parallel to the fixing plane. In its extended state, the focusing hood can be used with a single lens in the manner of a 35 mm camera finder. When the enlarging lens is pushed in, the focusing hood can be used with two lenses for assessing the image.

20 Claims, 6 Drawing Sheets

FOCUSING HOOD FOR USE ON A DIGITAL CAMERA

BACKGROUND OF THE INVENTION

1. Field of the Invention

The invention relates to a screen shade for use on a digital camera with an LCD display (screen). The invention also relates to a digital camera with a fitting for such a screen shade and for the fitting.

2. Description of Related Art

The LCD screen on a digital camera serves both in directing the camera when taking a photograph, i.e., as a classic viewfinder, and also for looking at and assessing the pictures already taken and stored in the camera. This double function has led to the LCD screens being made ever larger as the digital camera has developed, and at the time of this application, they are rarely less than 20 $cm^2$.

The LCD screen on a digital camera is typically located on the rear of the camera's body or casing so that the screen is more or less flat with the rear of the camera. It is easily accessible at all times in this location. However, this position is also problematic if the digital camera is to be used in the presence of a bright light source, e.g., outside in bright sunlight, or in the presence of spot lights in closed rooms. Even an extensive non-reflective LCD screen reflects so much light under these circumstances that the LCD image on a non-illuminated screen can barely be seen. At least this can be corrected for pictures already taken and stored in the camera by shading the screen by hand so that the image can be seen, but when using the screen as a classic viewfinder, this method of shading does not help since the camera can no longer be held in two hands ready to take the photograph.

Digital cameras, therefore, are typically fitted with an ordinary viewfinder as well as with the LCD screen. However, this not only has the disadvantage of making the construction costs for the camera more expensive, but also especially has the disadvantage of making the camera almost unusable in close photography—for which digital cameras are especially powerful—due to the parallaxes between the lens and the viewfinder. This is also the case for the use of lenses which extend or shorten the focal length which at least partly cover the viewfinder.

The same problems arise for digital cameras which have a reflex mechanism similar to that of a reflex camera, instead of a separate optical viewfinder. The photographer can only assess the panorama in front of the camera lens with this type of construction, even if only through the lens rather than through the optical viewfinder. However, due to the reflex mirror, the photographer is not in a position to assess the image stored in the camera before ultimately saving the image. Electronic viewfinders have the disadvantage that they only produce a very rough image which is of little use for arranging a picture. For professional photographers, therefore, neither the additional optical viewfinder nor the reflex mirror principle is a satisfactory solution for the problem of the LCD image which is barely discernable in the presence of strong light.

A further problem of digital cameras only fitted with an LCD screen is also one of their most important positive and attractive features, namely the exceptionally light and small construction, even for extremely powerful digital cameras. For professional pictures, however, these small digital cameras, which are only fitted with an LCD screen, can no longer be held stable by both hands supporting the camera against the head of the photographer in the form of a stable triangle.

SUMMARY OF THE INVENTION

Based on this state of technology, the technical problem underlying the invention is to develop a digital camera, in particular a freeze frame digital camera or single picture digital camera, such that the LCD screen remains discernable in light and even in very bright surroundings, and so that the digital camera can still be held against the forehead of the photographer in the triangle support position, as with normal small cameras, without losing the advantages of miniaturization of the digital camera.

The invention solves this problem with a screen shade for using a digital camera which has a removable fitting with adhesive for attaching a screen shade as described herein below.

The substance of the invention is based on creating a telescopic screen shade which is easy to fit and remove. The screen shade not only guarantees easy fitting by simply pressing it onto the rear of the camera, whether using Velcro strips or a notch connection, a bayonet fitting or other equivalent fitting, but it also allows the screen shade to be removed from the camera quickly and smoothly. The small, moveable and light construction of a digital camera, which are priorities when using the camera, even with powerful cameras, remains when using a screen shade according to the invention since this can be simply dismantled and stored in a case.

The telescopic feature of the screen shade, however, allows the camera to be relatively compact with the screen shade transport-ready, i.e., attached but not extended. Through its effective shading, even when light is coming relatively steeply from above, the screen shade allows the use of the screen shade telescoped outward as a type of optical viewfinder, while a larger view of the LCD screen with both eyes is possible by withdrawing the telescope or moving the lens. Such a view also allows an immediate assessment of the images on the LCD screen even in relatively bright surroundings due to the reflex-free, and thus unrestricted, contrast-rich LCD image.

According to the design of the invention, the telescopic extension of the screen shade can be fixed, for example, by means of a friction connection, by form or pressure connection using an adhesive or by using lockable or nonlockable drive. Since, in practice, the required extension between the shortest and longest extension is rarely more than 100%, the screen shade should preferably be designed with just two telescopic sections.

Regardless of whether the screen shade is made of two or more telescopic sections, another important feature of the invention is a magnifying lens, preferably fitted inside the telescopic sections of the screen shade, in see-through direction, i.e., from the photographer towards the LCD screen, beneath the external edge of the innermost telescopic section so that this lens fills the entire internal cross section of the innermost telescopic section. This magnifying lens also has an advantageous design as an anti-reflective non-reflective plane-convex condenser lens. As a result of this design of an anti-reflective magnifying lens, preferably, located 5–20 mm below the outermost edge of the telescopic screen shade, any external light can be prevented from accidentally entering the screen shade so that a reflection-free view of the LCD screen is guaranteed in practically all light conditions. The focal power of this lens is to be measured such that an optical magnification of the LCD screen is achieved when the magnifying lens is fully withdrawn, which allows an immediate assessment of focus, resolution and contrast without the resolution of the notch of the LCD being affected as a result of the magnification. According to this feature, for an optimum distance of the lens from the LCD screen, preferably of 60–95 mm, where external light can no longer penetrate, the lens's focal power should be in the region of 5.5 to 7.5 diopters (dpt), in particular, a focal power of +6.5 diopters.

For use as a viewfinder, the screen shade is focused and fixed by extending the magnifying lens so that the photographer can see the image on the LCD screen clearly with one eye while holding the end of the screen shade against the head. While the focus can be adjusted by moving the screen shade, and thus the magnifying lens, in and out when using only one eye, for optimal use of the magnifying function of the screen shade when using both eyes, the lens should be pushed in and the focus of the screen can be adjusted by changing the distance of the magnifying lens in the screen shade from the eyes.

A substantial feature of the practicability of the screen shade with the features of the invention is its fast and smooth attaching and removing while also having an absolutely reliably firm fitting on the camera against accidental removal. Preferably, this is guaranteed, by a feature of the invention, by pressing the screen shade on the rear of the camera using a notch connection produced by snaps which fix the screen shade to the camera using a shaped rear section. According to the design of the invention, this is realized through two bars of notches with holes which are arranged in parallel to two opposing sides of the LCD screen and which can be released or firmly attached to the camera's casing. One of these two bars of notches is designed as a rigid bar while the opposite bar is at least partially resilient.

The screen shade has complementing rigid snaps which are placed into the opposing openings in the bars when using the screen shade, and which also enter the opposing openings on the other side by briefly bending the resilient bar when pressing the screen shade. In this position, the screen shade and the digital camera cannot be separated and are rigidly and reliably connected by the connection. In order to remove the screen shade, on the other hand, a simple pressing of the resilient bar is required while pulling the screen shade from the rigid connectors. The resilient release of the screen shade connector can be made simpler by a corresponding element on the resilient bar, for example, a tongue or a simple rounding of the upper edge of the resilient bar. This rounding can also serve as a guide for the connector.

Moving the magnifying lens from the viewfinder function to the image viewing function can be by connecting it to the telescopic section of the screen shade and moving everything in and out. In this case, it is beneficial if an additional reflection protection tube is fitted independently of the telescopic section holding the lens.

However, a design is preferred where the magnifying lens is fitted on a lens holder independently of the section of the screen shade holding it, such that the magnifying lens can be moved with the lens holder into the image viewing position while the section of the screen shade farthest from the camera casing remains in the function of a reflection protection tube. A separate reflection protection tube is thus fully superfluous.

The invention is explained in more detail using an example in conjunction with the diagrams.

DETAILED DESCRIPTION OF THE INVENTION

Figure 1:
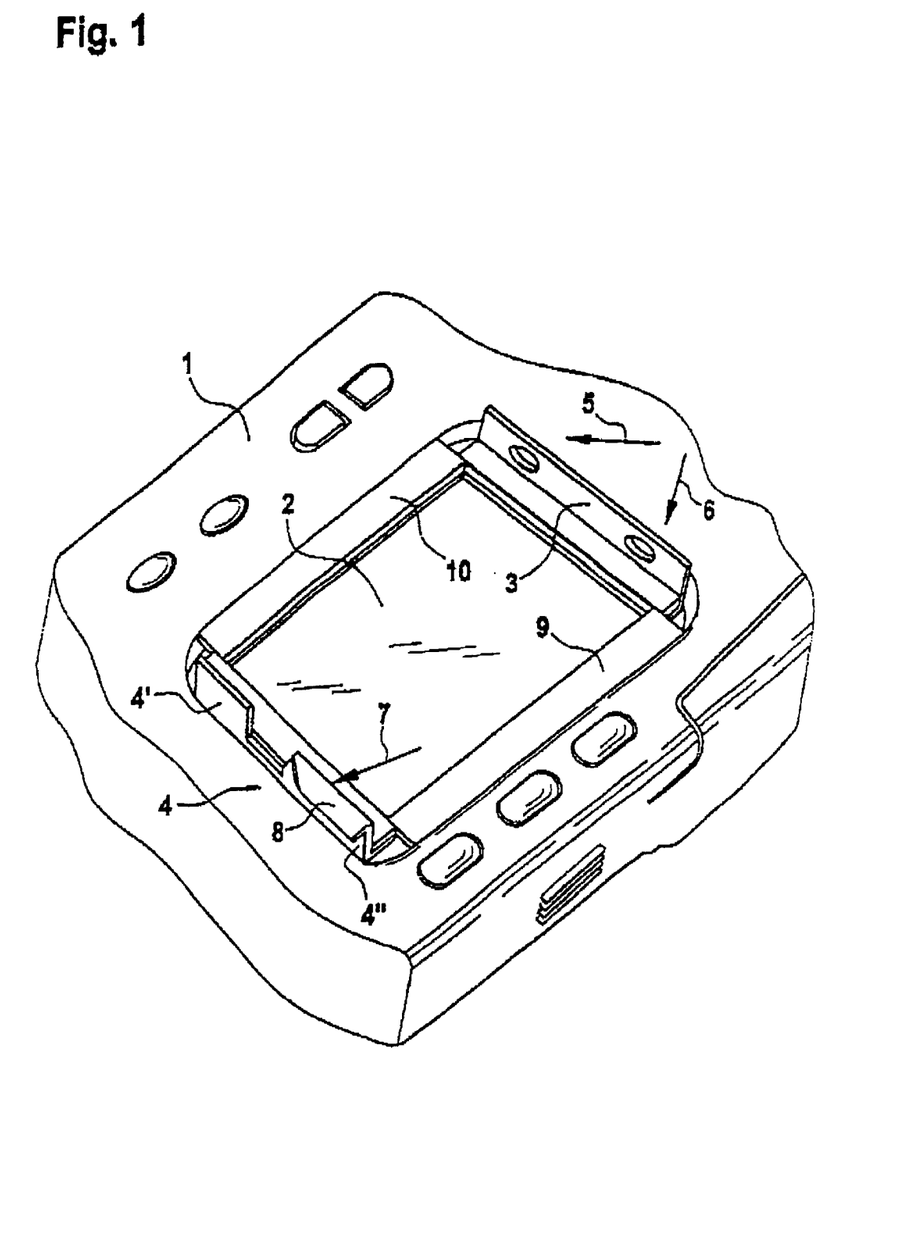
FIG. 1 is a perspective view of the rear of a digital camera with LCD screen and the fixing elements for fitting the screen shade of the invention.

FIG. 1 shows a perspective representation of the rear of a camera casing 1 of a digital camera with an LCD screen 2. Directly next to the LCD screen 2 on the opposite shorter sides are engagement bar 3 and 4 with holes 5, 6 and 7 which serve to hold the snaps 22, which are fitted correspondingly to the screen shade 11 as shown in FIG. 2.

The screen shade 11 serves as an LCD screen viewer and is an valuable accessory for working with the digital camera in bright light.

The engagement bar 3 is rigid and serves as the opposing fixed bar. The opposite bar is a resilient engagement bar 4 which is formed in two sections with one of the two sections 4' also being rigid as a guide bar, and the other section 4" is resilient in the form of a resilient tongue. The resilient section 4" has a rounded edge 8 which serves both as a guide for the snaps 22 of the shade 11 and as a handle for bending the resilient section 4" to release the screen shade 11.

Figure 2:
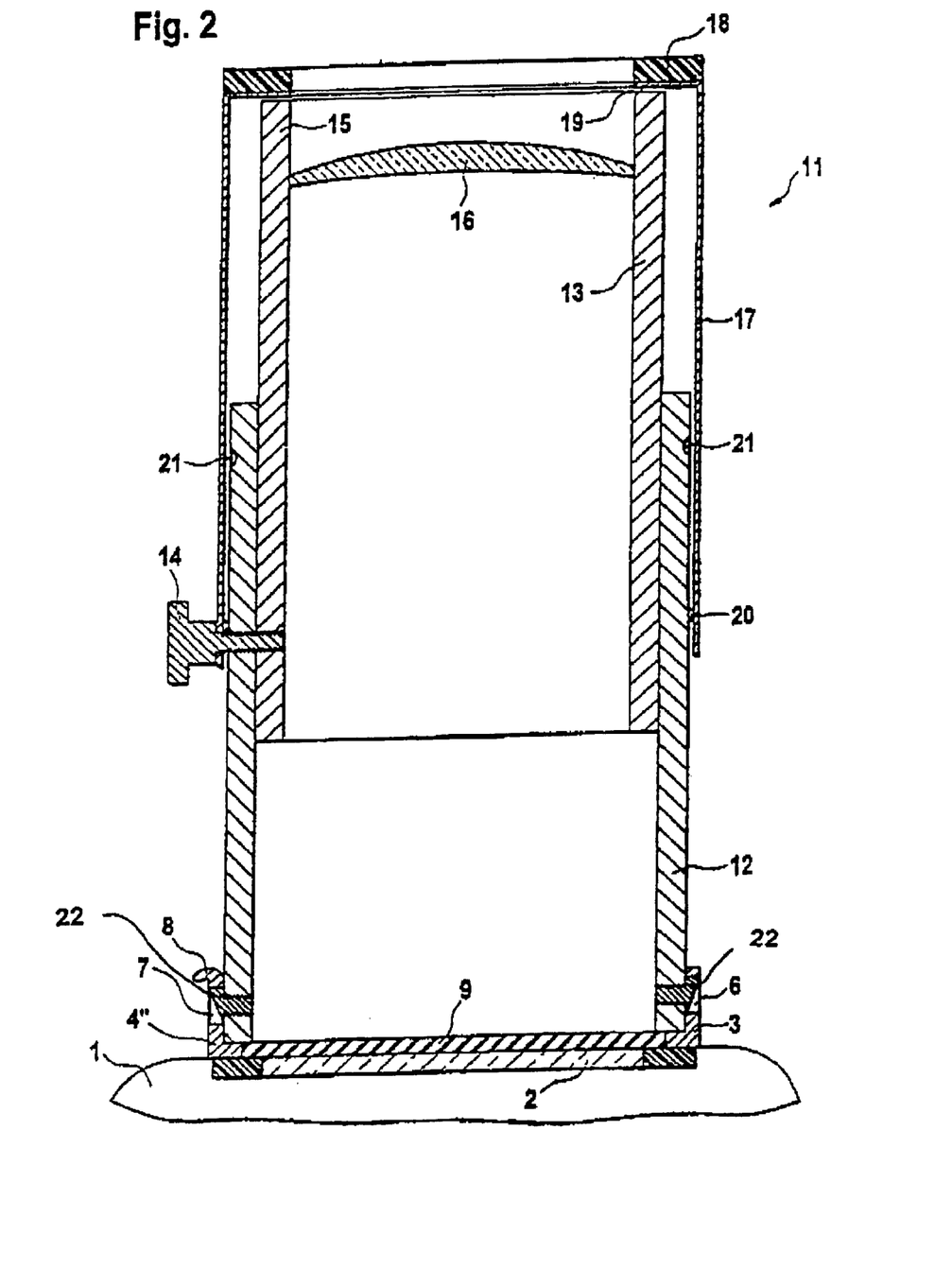
FIG. 2 is a cross section through a first example of a telescopic screen shade.

The fittings for connecting the screen shade 11, as shown in FIG. 2, can not only be designed in the form or two opposing engagement bars 3, 4, but they can also be configured as closed frame in the same way. When produced in the manner shown as two opposing bars, optical sealing strips 9, 10, made from felt or another optically separating material, can be inserted along the sides of the LCD screen 2 without bars, with thinner sealing bars around the connection bars if required, in order fully to prevent any light from reaching the LCD screen 2.

In order to attach the screen shade 11, in its extended form as shown in FIG. 2, with the camera casing 1 of the digital camera, two connector bars 22 are placed into the holes 5 and 6 on the rigid bar 3, for a slightly rounded screen shade 11. Hole 5 cannot be seen because it is behind hole 5 in the view of FIG. 2. Screen shade 11 is then swung down towards the opposing engagement bar 4 (only the resilient tongue 4" of which can be seen in FIG. 2) and pressed home, with the left-hand snaps 22 being fitted into hole 7 on the resilient engagement bar 4 after it has been resiliently bent back. The screen shade 11, which is now fixed to the camera in this way, by gently pushing the rear of the camera, is secured against turning or tilting in the plane of the LCD screen by the guide element 4' and the rigid bar 3, while it is also secured against twisting by the three snaps 22 in the three holes 5, 6 and 7 on the engagement bar 3 and 4 on the camera by a formed rear section.

As can be seen in FIG. 2, the screen shade 11 has two telescopic sections, namely an outer tube 12 and an inner tube 13, each with a square cross section. The cross section of the outer tube 12 has been selected such that, in size and shape, it exactly surrounds the LCD screen 2 and completely encloses it. The inner tube 13 has a similar shape. However, it is smaller than the outer tube 12 by the thickness of the tube wall and an amount enabling it to be moved with limited give.

The telescopic extension between the outer tube 12 and the inner tube 13 can be held by a tightening screw 14. Instead of the principle represented in FIG. 2 using the screw, the telescope can, of course, also be designed to be held, moved and released by friction, by a sprocket drive or other form. Important in conjunction with this is merely an effective force for fixing the extension to prevent the inner tube 13 being pushed into the outer tube 13, so that when the rounded upper edge 15 of the screen shade 11 is held to the head of the photographer to stabilize the camera when taking a picture, the inner tube 13 is not pushed in.

A magnifying lens 16 is fitted crossways in the inner tube 13 of the screen shade 11 below the outer edge or upper edge 15. The lens is positioned axially around 12 mm below the upper edge 15 of the screen shade 11. The magnifying lens 16 has a square outer contour which covers the entire inner cross section of the inner tube 13. An additional, careful anti-reflection covering on the magnifying lens 16, as well as the position of the magnifying lens 16 axially beneath the upper edge of the screen shade 11 guarantees that absolutely no light reaches the LCD screen, even under unfavourable light conditions. As a result, a reflection-free, focused and contour-rich viewing of the image is guaranteed, both for the one-eyed viewfinder function and in the withdrawn position of the inner tube 13 of the screen shade where the photographer can look at and assess the image with both eyes from a greater distance.

It must be expressly stated that, in order to explain the invention, only sketched demonstration examples are reproduced in FIGS. 1 and 2. It is obvious that, for mass production, a developed screen shade, for example, corresponding to FIGS. 3 to 5, does not leave the framework of the invention with other construction elements, but with the same or analogous functionality. Thus, for example, the design of the single step telescopic screen shade 11 described here is seen as a normal folding shaft or as a two-stage extendable screen shade as a direct adjustment of the example of the invention.

In the same way, the basic concept of the invention can also be realized by a screen shade where a cheaper, plain but anti-reflective piece of glass is used instead of a magnifying lens in order to save costs. This would, indeed, rule out the advantage of a magnified professional image, but would be suitable as a substantially cheaper option for amateur photographers which realize the benefits of the invention, namely the possibility of a reflection-free LCD screen on the digital camera and the use of a larger LCD screen as a viewfinder on all types of small cameras.

A telescopic reflection protection tube is fitted to the outer tube 12 in the first example in FIG. 2. On the end farthest from the camera casing 1, the telescopic reflection protection tube has a resilient stop face 18 which works in conjunction with an upper edge 15 of the inner tube 13. The reflection protection tube 17 has a nipple 20 on the inside which works in conjunction with an indentation 21 in the outer casing of the outer tube 12 which is located close to the outer end of the outer tube 12.

While the inner tube 13 can be held in place against the outer tube 12 using the screw 14 and can be moved, the reflection protection tube 17 is taken away from the camera casing 1, when the inner tube 13 is moved away, as a result of the upper edge 15 touching the stop face 18 until the nipple 20 is grasped by the indentation 21. This position, which makes the lens 16 be about 95 mm from the LCD screen 2, forms the viewfinder function in which the user sets the image and the lighting and color values with one eye to the outer surface opposite the stop face 18.

After taking the picture, the screw 14 is released and at the same time the inner tube 13 is pushed into the outer tube 12 by pushing the screw 14 along a slot in the outer tube 12, while the magnifying lens 16 is moved into the image viewing position, with the lens being about 60 mm from the LCD screen 2. The reflection protection tube 17 remains in position as a result of the nipple 20 being connected to the indentation 21, which forms a shade for the magnifying lens 16 and the LCD screen 2. Using the magnifying function of the magnifying lens 16, the user can assess the image taken without light reflection and the negative influence of additional light. The reflection protection tube 17 is moved towards the camera casing by a slight amount of pressure towards the camera casing 1, in order to completely withdraw the screen shade into its transport position, which separates the nipple 20 from the indentation 21 and the entire screen shade 11 moves into a compact transport position.

The second example represented in FIGS. 3 to 6 is different from the first example just described because it does not have an external reflection protection tube, but instead, the magnifying lens 116 is fixed to a lens holder 135 which is can be moved within the inner tube 112. In this way, the extended inner tube 113 acts as a reflection protection tube in this example as the magnifying lens 116 is moved towards the camera casing 101. In the second example, all parts which have the same or a similar function to those in the first example are labeled the same, increased by 100, e.g., so that the engagement bar 104 corresponds to the engagement bar 4 of FIG. 1.

An LCD screen 102 is located on the rear of the camera casing 101. Along both long sides of the rectangular LCD screen 102, there is a rigid engagement bar 103 and another engagement bar 104, with the latter have a moveable resilient section in the form of a tongue 104A. The bar 103 has two holes 105 and 106. The resiliently movable tongue 104A of the engagement bar 104 has a similar hole shown only in FIG. 6. Holes 105 and 106 hold the connecting rods 132 and 133, respectively, which are fixed to the camera casing end of the outer tube 112 of the screen shade 111. Opposite the connection rods 132 and 133, there is a bar 134 on the outer tube 112. This goes into the hole in the tongue 104A as shown on the right in FIG. 6.

The screen shade 111 is thus connected to the bars 103 and 104 such that, at first, the connecting rods 132 and 133 enter the holes 105 and 106 respectively in a tilting movement, after which the tongue 104A is moved from bar 103 by being pressed, and then, the connecting rod 134 enters the hole in tongue 104A due to the greater distance between the connecting rods. After tongue 104A has returned to its original position, the outer tube 112 is securely attached to the camera housing 101.

In order to secure an optical seal between the camera housing and the lower edge of the outer tube 112, additional sealing bars 143 can be fitted to the rear of tube 112 or on or between bars 103 and 104. These are similar to the sealing bars 9 and 10 in FIG. 1. In the outer tube 112, there is a movable inner tube 113 such that it can be moved with some give on the inner wall of the outer tube 112.

The wall of the outer tube 112 is penetrated by a screw 114. Screw 114 is connected to the inside with a square nut 124. The square nut 124 is moved sideways by guides 125 and 126 attached to the inside of the wall of the outer tube 112. It is limited in its movement towards the camera casing 101 by guide bar 128 that is also attached to the inside of the outer tube 112. At the other end, an upper guide 127 is connected to the inside of the outer tube 112 so that the square nut can only move at right angles to the movement of the inner tube 113.

Figure 4:
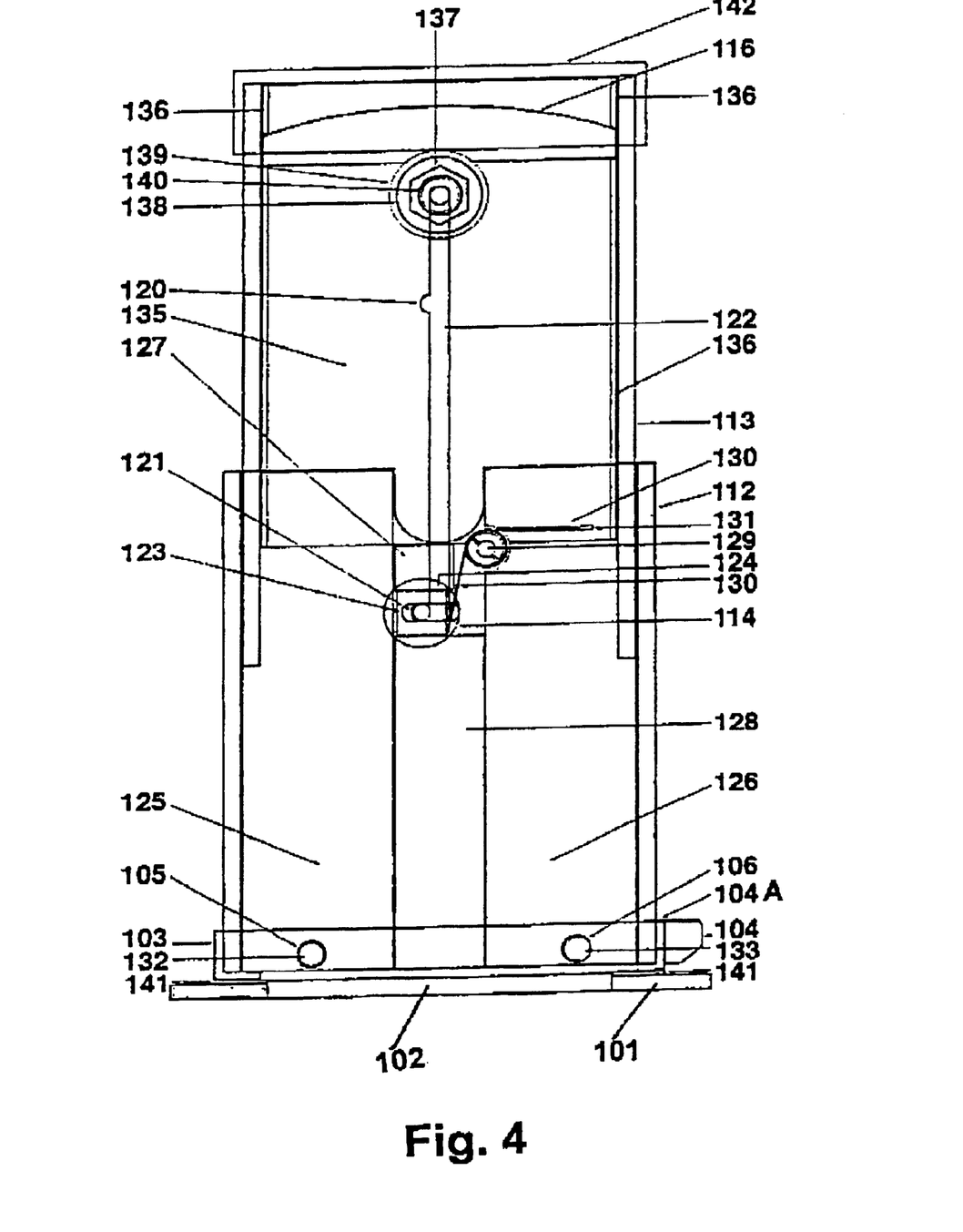
FIG. 4 is a cross section through the second example of a telescopic screen shade in an extended position.

The guide screw 114 and the square nut 124 are also retained in their left-hand side position by a spring 130 as shown in FIG. 4. Spring 130 is held to a spring holder 129 on the inside of the outer tube 112 and its other end is held by slot 131 which is also in the inside of the outer tube 112.

A smooth section of the screw 114 runs parallel to the axial movement of the inner tube 113 in slot 122 in the wall. This guide slot 122 has a lower indentation 121 on the end facing the camera casing 101, which runs at right angles to the guide slot 122 (see FIG. 3). Farther from the camera casing 101, the guide slot 122 has an upper indentation 120, which also runs at right angles to the guide slot 122 (see, FIG. 4).

Figure 3:
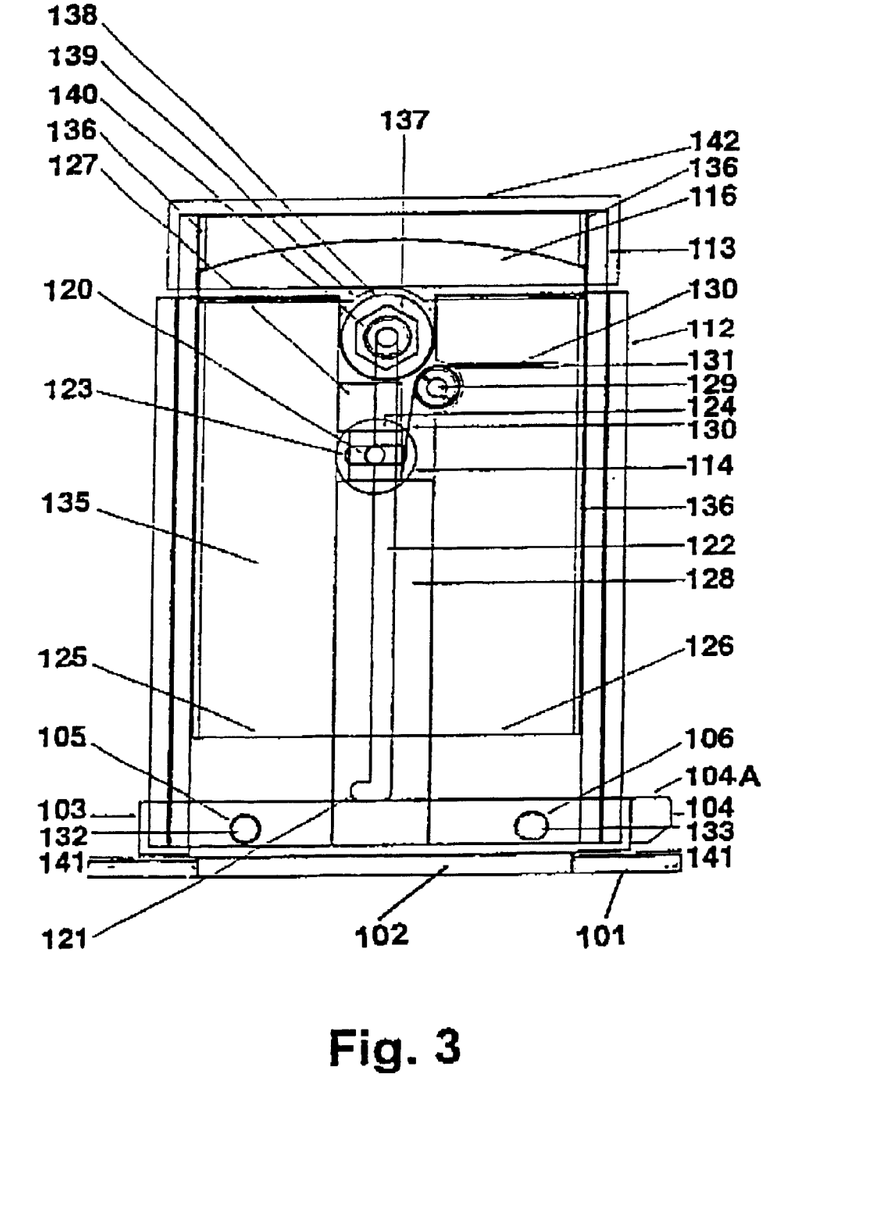
FIG. 3 is a cross section through a second example of a telescopic screen shade, withdrawn for transport.

The side of the spring 130 in FIGS. 3 and 4 press the screw 114 toward the upper indentation 120 or lower indentation 121 so that the inner tube 113 cannot twist axially upon entry in the indentations. The axial movement of inner tube 113 is facilitated by moving the screw 114 to the right against the spring 130 in the main extension direction of the guide slot 122. The tube stops automatically when it reaches indentation 120 or 121 due to the pressure from the spring. Cross movement of the outer tube 112 is facilitated by screw 123 running at right angles to the guide slot 122. This is located in the indentations 120 or 121 upon stopping.

In the second example, the guide slot 122 has another function. It also serves to guide the lens holder guide screw 137. The guide screw 137 (FIG. 6) penetrates the wall of the inner tube 113 and a thin, moveable lens holder 135 in the inner tube 113. The lens holder 135 has a U-shaped profile, and it is preferably produced by cold folding a MAKROLON® foil. The two folded side sections 136 act as guides in the square cross section of the inner tube 113. Close to its upper end, near the side sections 136, the lens holder 135 has gaps which can hold a magnifying lens 116. Since the material of the side sections 136 continues above the magnifying lens 116, this is moved axially by the lens holder 135 and radially by the inner wall of inner tube 113, as mounted.

The lens holder guide screw 137 is connected on the outside to a milled nut 138 which acts as a handle. Close to its axial guide in the guide slot 122, it is smooth like a shank screw. On the upper surface of the inner tube 113, there is a slider 139 around the lens holder guide screw 137. A spring 140 between the milled nut 138 and the slide 139 ensures that the lens holder 135 and the inner tube 113 are pressed together and as a result of the pressure, it is secured against accidental movement. This pressure from spring 140 can be released by gently pressing the top of the milled nut 138 so that the lens holder 135 and the magnifying lens 116 can be moved along the guide slot 122 in the inner tube 113.

At the outer end of the inner tube 113, there is a rubber fitting 142 for the user to place his or her eye against when using the screen shade 111 as a viewfinder as shown in FIG. 4.

The screen shade 111 thus has three different positions which correspond to three different functions. For example, in FIG. 3, the inner tube 113 is displaced into the outer tube 112 with the fixing screw 114 in the indentation 120. This position is the compact transport position. In order to prepare the camera for photographing, the fixing screw 114 is pressed to the right against the pressure from spring 130, where screw 114 also acts as the handle for moving the inner tube 113 from the position shown in FIG. 3 to the position shown in FIG. 4. In FIG. 4, the inner tube 113 is fully extended, with the fixing screw 114 in the lower indentation 121. The user now places his or her eye to the rubber fitting 142 and uses the screen shade together with the LCD screen 102 as a viewfinder for the photograph by looking through the magnifying lens, which has a focal distance of about 150 mm for magnification of about +6.5 dioptres. Because of the shading from the screen shade 111, the LCD screen provides a contrast-rich image which facilitates the camera's or optic's perfect setting in respect of the image, as well as the settings for the light and color conditions.

Figure 5:
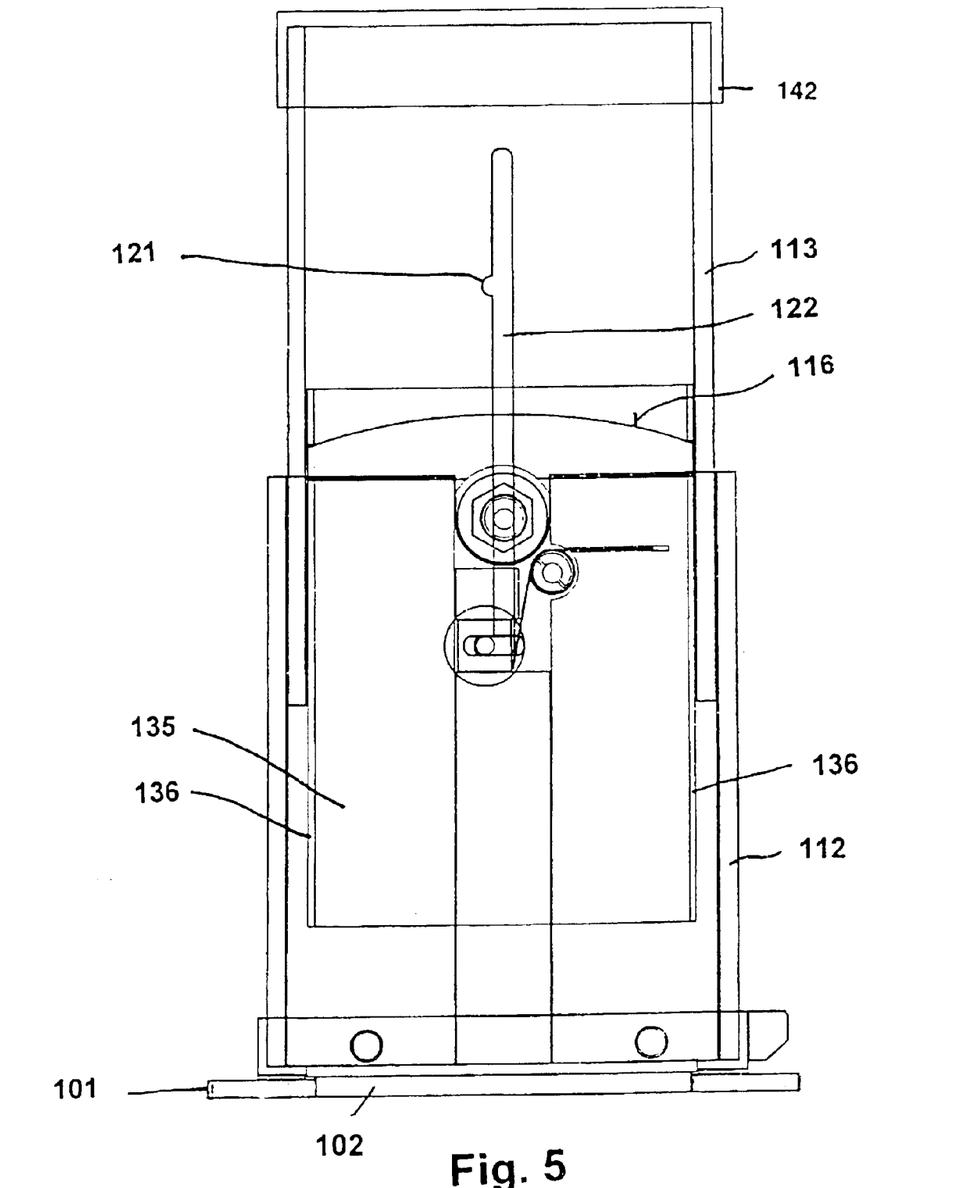
FIG. 5 is a cross section through the second example of a telescopic screen shade with a withdrawn magnifying lens in the position for viewing the image.
Figure 6:
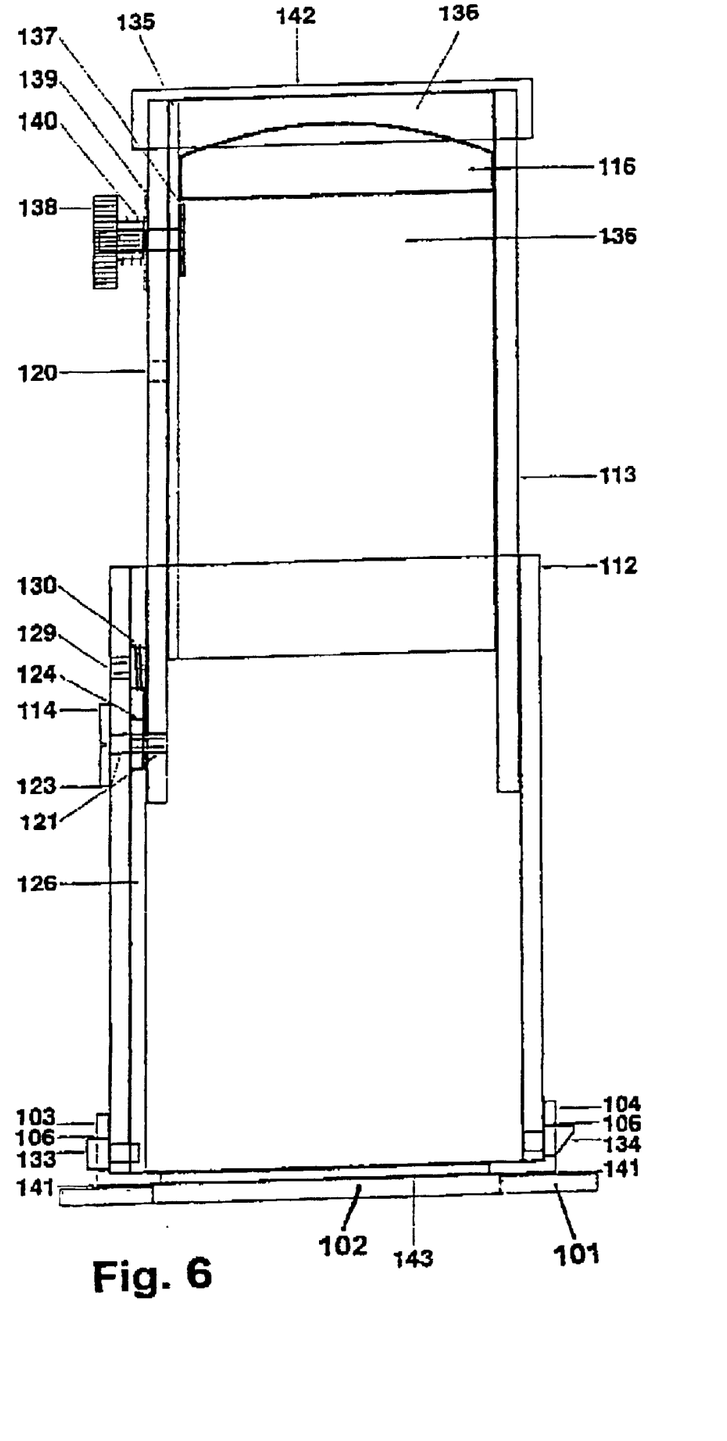
FIG. 6 is a sectional view taken at a right angle with respect to the view of FIG. 4.

After taking the picture, the user lightly presses the top of the milled nut 138 and moves it, and thus, the lens holder 135 connected to the lens holder guide screw 137 towards the wall of the camera's casing 101 without moving the inner tube 113. This reduces the distance between the magnifying lens 116 and the LCD screen 102 from about 95 mm in the position in FIG. 4 to about 60 mm as shown in FIG. 5. The position in FIG. 5 now serves for the viewing of the picture taken and displayed on the LCD screen 102, with the magnifying lens 116 also enlarging this image. Since the wall of the inner tube 113 extends relatively far beyond the magnifying lens 116, no light can reach the LCD screen from the outside which could affect the contrast-rich image on the LCD screen 102.

If other photographs are to be taken, gentle pressure on the milled nut 138 allows the lens holder guide screw 137 with the lens holder 135 to be moved back into position as shown in FIG. 4. This movement between the positions shown in FIGS. 4 and 5 is repeated until all desired photographs have been taken, whereupon, the screen shade is moved back into the compact transport position in FIG. 3.

Lens holder 135 is made from a dark, matt plastic, preferably from MAKROLON®, and covers the guide slot 122 on the extended inner tube 113 and with the magnifying lens 116 raised.

Engagement bars 103 and 104 are fixed using a subsequent fixing material, preferably double-sided tape which is covered with a specially removable adhesive on the side facing the rear wall of the camera casing 101. For mass production, engagement bars 103 and 104 can be attached to the wall directly by the manufacturer. A removable fixing for the screen shade 11 or 111 is useful in any case since it is not required under normal conditions, i.e. in normal lighting conditions or when photographing in enclosed spaces, and can then be removed.

What is claimed is:

1. Screen shade for use on a digital camera with an LCD screen in a wall of a camera casing, comprising at least two telescopic sections of which a first section has means for attachment thereof to the camera casing surrounding the LCD screen and a second section which is telescopically movable relative to the first section for movement, when attached to the camera, toward and away from the camera casing; wherein a magnifying lens is fitted in the second section of the screen shade and is movable between a first, extended viewfinder position, a second picture viewing position in which the lens is positioned closer to a camera attachment end of the first section and an third inactive transport position, and wherein a reflection protection means for protecting against reflection when said magnifying lens is in the picture viewing position is provided, said reflection protection means remaining extending when said magnifying lens is moved inward from said extended viewfinder position.

2. Screen shade as claimed in claim 1, further comprising a fixing means for fixing the second section of the screen shade at an extended length relative to the first section.

3. Screen shade as claimed in claim 1, said means for attachment comprises connectors for removably attaching the sunshade to the camera casing.

4. Screen shade as claimed in claim 3, wherein said connectors comprise one of bars and holes which are mountable on two sides of the LCD screen and which detachably engageable with complementary holders on the first section of the screen shade.

5. Screen shade as claimed in claim 4, wherein at least one of the bars is resiliently deflectable at least in part.

6. Screen shade as in claimed in claim 5, wherein the resiliently deflectable bar has an ergonomically designed grip for disengagement thereof from the respective complementary holder.

7. Screen shade as claimed in claim 1, wherein the magnifying lens has a focal power in a range from 0.5 dpt to 7.5 dpt.

8. Screen shade as claimed in claim 1, wherein the magnifying lens has a focal power of 6.5 dpt.

9. Screen shade as claimed in claim 1, wherein the magnifying lens has a focal distance of about 150 mm.

10. Screen shade as claimed in claim 1, wherein the magnifying lens is positionable about 60 mm from a camera casing mounting surface of the attachment means for image viewing and a distance of about 95 mm therefrom for viewfinder use.

11. Screen shade as claimed in claim 1, wherein the magnifying lens is positioned in an inner tube of the second section of the telescopic screen shade, about 5 to 20 mm below an upper edge of the second section of screen shade.

12. Screen shade as claimed in claim 1, wherein said second section has an uncovered open upper end above the magnifying lens.

13. Screen shade as claimed in claim 1, wherein the first section comprises an outer tube of the telescopic screen shade and the second section comprises an inner tube, wherein said reflection protection means is a reflection protection tube mounted on the outer tube, and wherein an upper end of reflection protection tube comprises a resilient stop face having an outer side engageable by an eye area of a user and an opposite inner side which is engageable by the inner tube for movement of the reflection protection tube on the inner tube to a position of maximum extension.

14. Screen shade as claimed in claim 13, further comprising nipples on the reflection protection tube which fit into complementary indentations on an outer side of the telescopic screen shade such that the telescopic reflection protection tube is holdable in an extended position when the inner tube is withdrawn from said position of maximum extension.

15. Screen shade as claimed in claim 1, wherein the magnifying lens is moveable on a lens holder in the second section of the screen shade, said second section forming said reflection protection means.

16. Screen shade according to claim 1, wherein a parallel guide slot is provided in the second section of the screen shade for guiding the second section relative to the first section.

17. Screen shade as claimed in claim 16, wherein the magnifying lens is moveable on a lens holder in the second section of the screen shade, and wherein the guide slot has means to activate and guide movement of the lens holder in the second section of the screen shade.

18. Digital camera, comprising a camera casing, an LCD screen in a wall of the camera casing, a sunshade having at least two telescopic sections of which a first section has means for attachment thereof to the camera casing surrounding the LCD screen and a second section which is telescopically movable relative to the first section for movement toward and away from the wall of camera casing; wherein a magnifying lens is fitted in the second section of the screen shade and is movable between a first, extended viewfinder position, a second picture viewing position in which the lens is positioned closer to a camera attachment end of the first section and an third inactive transport position, and wherein a reflection protection means for protecting against reflection when said magnifying lens is in the picture viewing position is provided, said reflection protection means remaining extended when said magnifying lens is moved inward from said extended viewfinder position.

19. Digital camera as claimed in claim 18, wherein said means for attaching comprises at least two bar-shaped fixing elements fixed to the camera casing by adhesive.

20. Digital camera as claimed in claim 19, wherein said adhesive is formed by a removable double-sided adhesive tape.

* * * * *